United States Patent

Platano

Patent Number: 5,810,399
Date of Patent: Sep. 22, 1998

[54] CLAMP FOR GROUND GLASS JOINT

[75] Inventor: Joseph J. Platano, Danbury, Conn.

[73] Assignee: Westco Scientific Instruments, Inc., Danbury, Conn.

[21] Appl. No.: 738,680

[22] Filed: Oct. 28, 1996

[51] Int. Cl.$^6$ ........................................ F16L 37/14
[52] U.S. Cl. ............................. 285/38; 285/305; 285/911; 24/27; 24/546; 24/566
[58] Field of Search ..................... 285/305, 308, 285/911, 38; 24/566, 557, 546, 27

[56] References Cited

U.S. PATENT DOCUMENTS 3,129,476  4/1964  Sindlinger ........................... 285/911 X

FOREIGN PATENT DOCUMENTS 1419014  10/1965  France ................................. 285/911

Primary Examiner—Terry Lee Melius
Assistant Examiner—Heather Shackelford
Attorney, Agent, or Firm—Schweitzer Cornman Gross & Bondell LLP

[57] ABSTRACT

A clamp for securing ground-glass joints between first and second tubes, the first tube having a shoulder located inward of its end, intermediate the ground and unground portions thereof, adjacent the ground joint, and the second tube having an enlarged lip located at its end adjacent the ground joint and the shoulder of the first tube. The clamp has an mounting portion and an attaching portion having first and second parts for accommodating the shoulder and the enlarged lip therebetween, followed by a releasing portion. The mounting portion connects the first and second parts and has forward ends extending substantially symmetrically along a longitudinal axis of the clamp. The forward ends of the mounting portion are biased toward one another by the clamp. The first part of the attaching portion is an attaching collar for partially fitting around the circumference of the first tube adjacent the shoulder rearwardly of the transverse axis. The second part is disposed below the first part and is adapted to engage the second tube at locking points located substantially symmetrically on the periphery of the second tube, forwardly of a transverse axis of the clamp for locking together the first and second tubes. The releasing portion is adapted to manually force apart the mounting portion and transfer the contact between the second part and the second tube from the locking points located forwardly of the transverse axis to releasing leverage points located rearwardly of the transverse axis so that the clamp easily slides off the joint. The releasing portion provides a mechanical advantage to open the clamp and can include loop portions for great comfort.

14 Claims, 4 Drawing Sheets

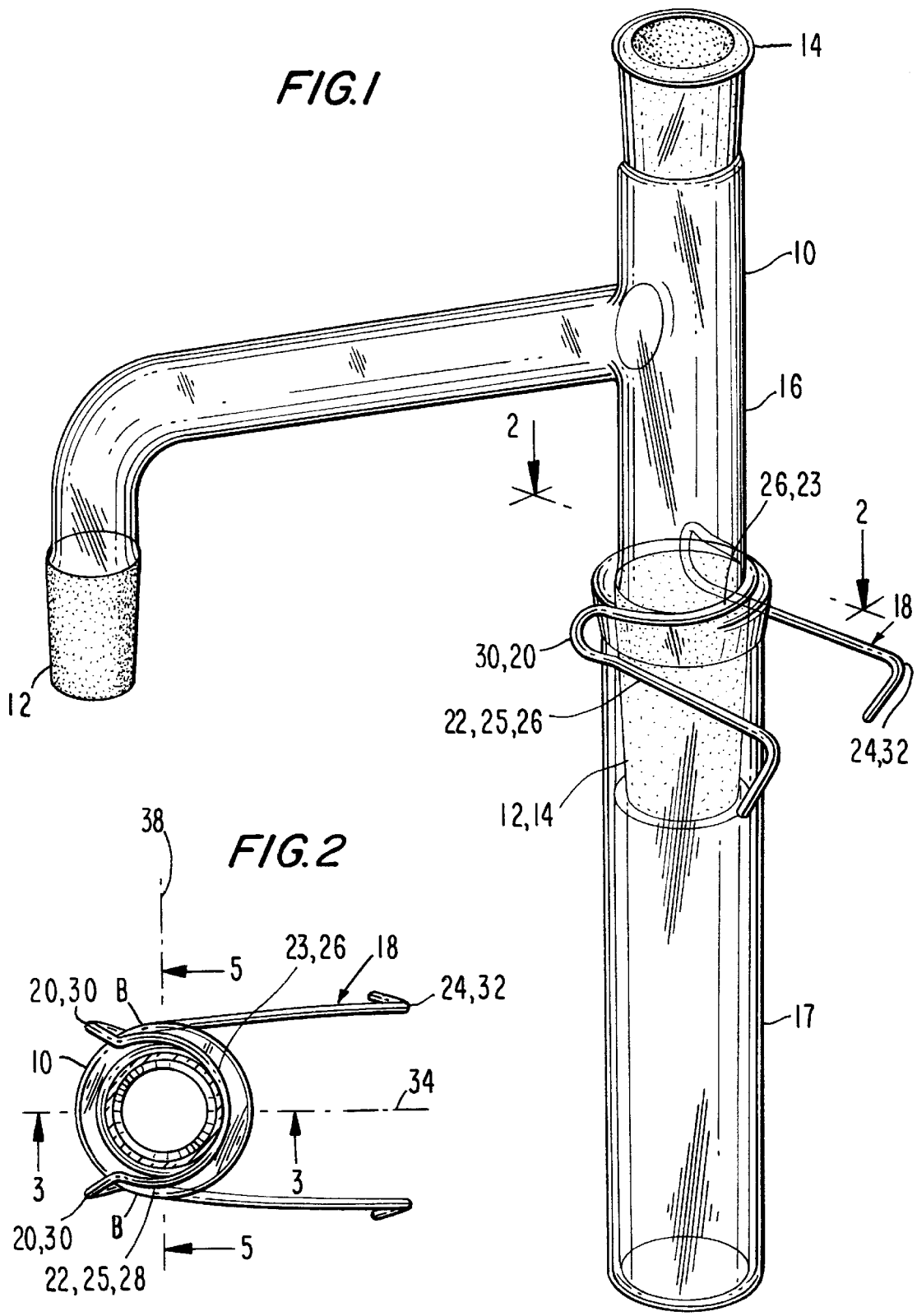

CLAMP FOR GROUND GLASS JOINT

FIELD OF THE INVENTION

This invention pertains to clamps and, in particular, to clamps for holding together the components ground glass joints.

BACKGROUND OF THE INVENTION

In technical fields, such as in chemistry, it is often desirable to join tubes together by a ground glass joint that provides a hermetic seal between two tubes. The joints are removably fitted together and can easily come apart, spilling the circulating media and frustrating the process.

Ground glass joints typically couple a smaller diameter tube with a tapered cross-section at its end within a larger diameter tube having a larger complimentary taper. The larger tube has an enlarged lip at the end of the tube. The smaller tube has a shoulder portion inward of its end, intermediate the ground and unground portions thereof, such that the shoulder is adjacent the ground joint and is also adjacent the lip on the larger tube when the narrow tube is fitted within the larger tube.

Releasable clamps are known which engage the lip and the shoulder of these types of tube joints to maintain the component parts of the joint together. A known clamp of this type has a plastic or metal clip portion with two resiliently flexible semicircular tube engaging sections secured to one another-one above the other. Each semicircular section engages and snaps around one tube on opposite sides of the joint, so that the two sections each trap the lip and the shoulder respectively, and prevent the tubes from parting.

In these known clamps, the openings of the tube engaging sections are narrower than the diameters of the tubes, therefore, to install or remove the clamp, the sections must be expanded and snapped around the tubes. To accomplish this, the clamp must be gripped and pushed on (or pulled from) the joint with one hand, while the tubing is supported with the other. This type of clamp is an effective device for creating releasable, semipermanent connections between tubes, however, the significant force required to mount the clamp can cause discomfort. Also, the method required for their installation and removal usually necessitate that the tubing be simultaneously supported with a second hand, requiring additional effort, care and time. Moreover, when, as is normally the case, the tubing must be supported by hand during removal of a clamp, the tubing may be subjected to potentially damaging forces. This is so because the force required to release this type of prior art clamp is significant and, when the clamp snaps off, the tubing may be temporarily subject to the force of the supporting hand alone, unbalanced by the forced previously applied by the hand gripping the clamp. This can cause damage to the tubing if special care is not taken, especially if other portions of the tubing remain connected to other joints. Additionally, this type of prior art clamp is relatively expensive to manufacture.

Another type of fastener, typically used to marry ball and socket ground glass joints, is disclosed in U.S. Pat. No. 2,397,438. This prior art clamp consists of two Y-shaped pieces hinged together along their stems. The forked jaws contact opposite sides of the joint and are biased against the joint by a spring. The jaws may be secured in the closed position by tightening a screw-locking device between the stems. To release the clamp, the screw-locking device is loosened and the stems are compressed together, opening the forked jaws. This type of prior art clamp avoids the use of potentially damaging force, however, the clamp is relatively expensive due to the number or parts and the number steps required during manufacturing.

What is desired therefore, is a clamp for releasably securing ground-glass joints, which is economical to manufacture, and which can be installed and removed simply and with relatively little force.

SUMMARY OF THE INVENTION

Accordingly, it is an object of the invention to provide a clamp for ground-glass joints, which can be installed and removed in an efficient and simple manner, with relatively little force.

It is another object to provide a clamp of the above character which is economical to manufacture.

It is yet another object to provide a clamp of the above character with a means to partially release the grip of the clamp prior to its removal to reduce the effort necessary to remove the clamp.

It is still another object to provide a clamp of the above character which can be installed and removed, with relatively little force applied to the tubing, by compressing a portion of the clamp between the thumb and forefinger of one hand and sliding the clamp around the joint.

It is yet still another object to provide a clamp of the above character with has mounting portion, an attaching portion and a releasing portion composed of a single piece of resiliently-flexible wire.

It is another object to provide a clamp of the above character which is comfortable to mount and remove.

These and other objects are realized by the spring steel clamp of the present invention which is for securing a ground glass joint between a first tube having a smaller diameter, and a second tube having a larger diameter, the first tube having a shoulder located inward of its end intermediate the ground and unground portions thereof adjacent the ground joint, and the second tube having an enlarged lip located at its end adjacent the ground joint and the shoulder of the first tube. Moving backward from the front of the clamp, and disposed about its longitudinal axis of symmetry is mounting portion, followed by an attaching portion having first and second parts for accommodating the shoulder of the smaller tube and the enlarged lip of the larger tube between the first and second parts, followed by a releasing portion. A vertical axis of the clamp is disposed vertically perpendicularly to the aforementioned longitudinal axis, and the clamp also has a transverse axis that is horizontally perpendicular to the longitudinal axis at the intended location of the maximum diameter of the tubes. The mounting portion connects the first and second parts and has suitably outwardly flaring forward ends extending substantially symmetrically along the longitudinal axis for easy mounting of the clamp about the joined tubes. The forward ends of the mounting portion are biased toward one another by the spring steel clamp. The first part of the attaching portion is an attaching collar for partially fitting around the circumference of the first tube adjacent the shoulder on both sides of the transverse axis. The second part is disposed parallel to and below the first part and has means for engaging the second tube at two locking points located substantially symmetrically on the tube periphery forwardly of the transverse axis of the second tube for locking the tubes together. The releasing portion has means for manually forcing apart the mounting portion and for transferring the contact between the second part and the second tube from the locking points located forwardly of the transverse axis to releasing leverage points located rearwardly of the transverse axis. The releasing portion provides a mechanical advantage in opening the clamp for easy mounting and removal.

BRIEF DESCRIPTION OF THE DRAWING

For a more complete understanding of the above and other features and advantages of the invention, reference should be made to the following detailed description of the invention and the accompanying drawing, wherein:

FIG. 1 is a perspective view of a first embodiment of a clamp of the present invention installed on a ground glass joint;

FIG. 2 is a plan view of the clamp of FIG. 1 taken along the line 2—2 of FIG. I showing the clamp in the installed position;

DETAILED DESCRIPTION OF THE INVENTION

Figure 5:
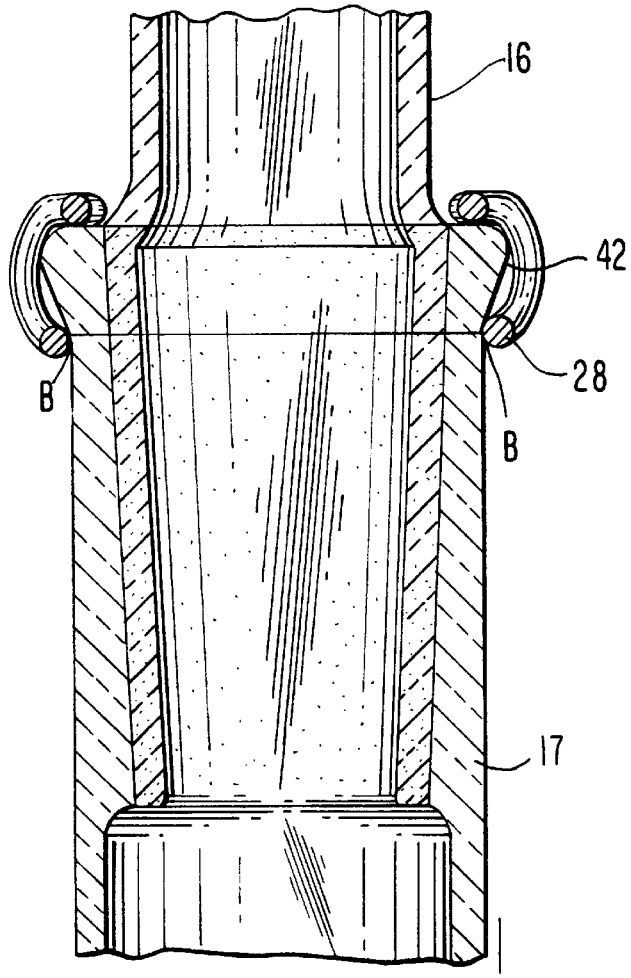
FIG. 5 is a vertical cross-sectional view of the clamp of FIG. 2 taken along the line 5—5 of FIG. 2.

Referring to FIGS. 1 and 2, glass tubes 10, such as those used in chemical laboratories, typically include ground glass joint portions 12, 14. To join tubes of this type, an external ground glass portion 12 on the smaller tube 16 is inserted into a flared, funnel shaped internal ground portion 14 on the larger tube 17, thereby forming a mated hermetic seal between the tubes.

Suitably, a clamp 18 of the present invention is comprised of a single length of spring steel shaped by bending, and includes mounting portion 20, an attaching portion 22, and a releasing portion 24. The attaching portion 22 has a first or upper part 23 that includes a n attaching collar 26 and a second locking part 25 having locking portions 28.

The first part 23 with its attaching collar 26 contacts and retains the periphery of the smaller tube 16, while the second part 25 with its locking portions 28 contacts and retains the larger tube 17 at locking points B, as described in greater detail with reference to FIGS. 3 and 4. The attaching collar 26 also serves as a spring to bias the locking portions 28 against the large tube 17. The mounting portion 20 includes outwardly-turned, semicircular guides 30, which guide the attaching collar 26 and the locking portions 28 around the tubes during mounting of the clamp. The guides 30 also connect the first or upper part 23 to the second or lower part 25.

As best shown in FIG. 2, the releasing portion 24 includes lever arms 32 connected to and extending from the locking portions 28 of the second part 25. The extreme ends of the lower arms 32 can be formed into loops to provide greater comfort when mounting and removing the clamp 18. The mounting portion 20, attaching portion 22 and releasing portion 24 are all substantially symmetrically disposed along a longitudinal axis 34 of the clamp 18. The clamp 18 also has a transverse axis 38, which is perpendicular to its longitudinal axis 34, and when the clamp is applied to the glass joint, coincides with the largest diameter of the tubes.

Figure 3:
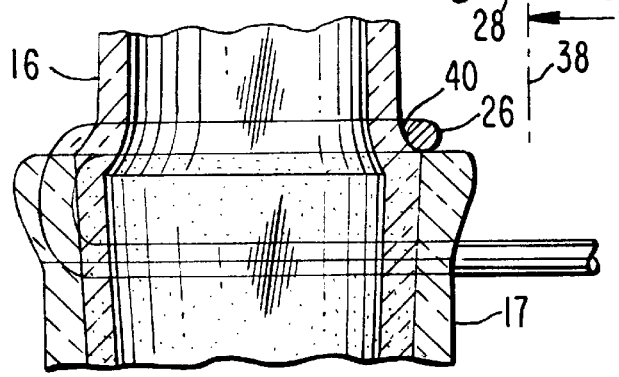
FIG. 3 is a horizontal cross-sectional view of the clamp of FIG. 2 taken along the line 3—3 of FIG. 2.
Figure 4:
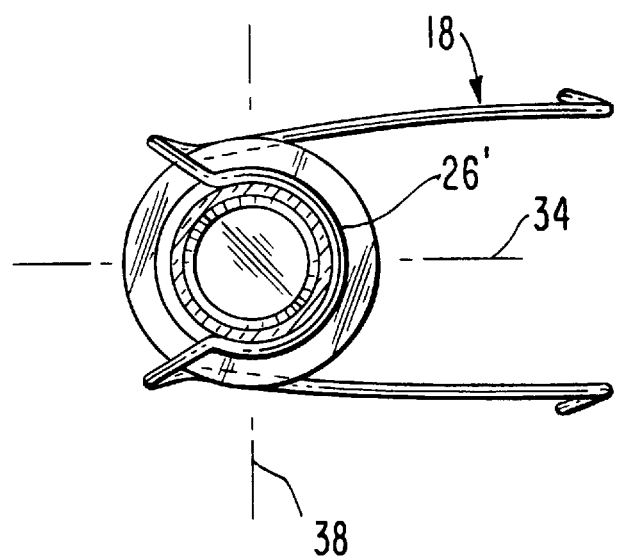
FIG. 4 is a plan view of a second embodiment of a clamp of the present invention.

As best shown in FIGS. 2, 3 and 5 the collar 26 suitably encircles the smaller tube 16 over more than half of its circumference and contacts the shoulder 40 rearward of the transverse axis 38. The locking portions 28 contact the larger tube 17 below its enlarged lip 42 at locking points B located on opposite sides of the longitudinal axis 34 forward of the transverse axis 38, thereby securing the two tubes together and locking the clamp 18 onto the joint. The clamp 18 will function properly if the collar 26 loosely partially encircles the smaller tube 16 (as shown) as long as some portion of the collar 26 (such as the trough) contacts the shoulder 40 of the smaller tube 16 rearward of the transverse axis 38. However, as shown in FIG. 4, suitably the collar 26' tightly partially encircles the smaller tube 16 over more than half the periphery thereof so that it contacts the shoulder 40 or both sides of the transverse axis 38. The tightly encircling collar 26' will mate the grand glass joint more securely than the loosely-encircling collar 26. On the other hand, a clamp 18 with a loosely-encircling collar 26 is easier to remove. The collar 26 is suitably semi-circularly shaped (as depicted), however other configurations are also within the scope and spirit of the invention including, without limitation, open-sided shapes such as open-side triangles, squares or other open-sided polygons which conform to the periphery of the smaller tube 16. The locking portions 28 are suitable substantially straight to provide a narrow point of contact with the larger tube 17. As will be further described below, a narrow point of contact aids in the removal of the clamp 18. However, to provide a more secure joint, the locking portions 28 can include curved portions (not shown) which follow the circumference of the larger tube 17.

Figure 6:
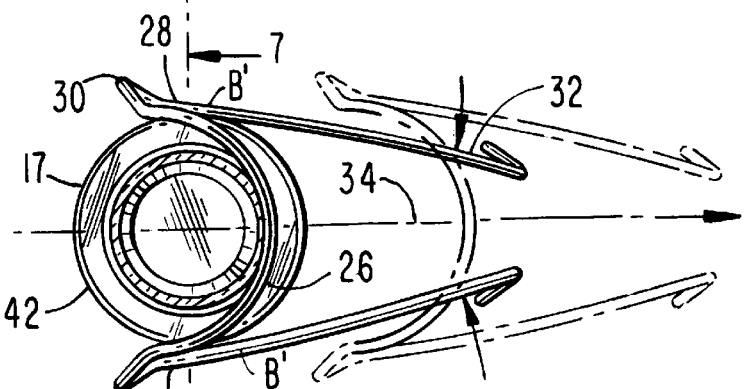
FIG. 6 is plan view of the clamp as in FIG. 2 showing the clamp as it is removed.
Figure 7:
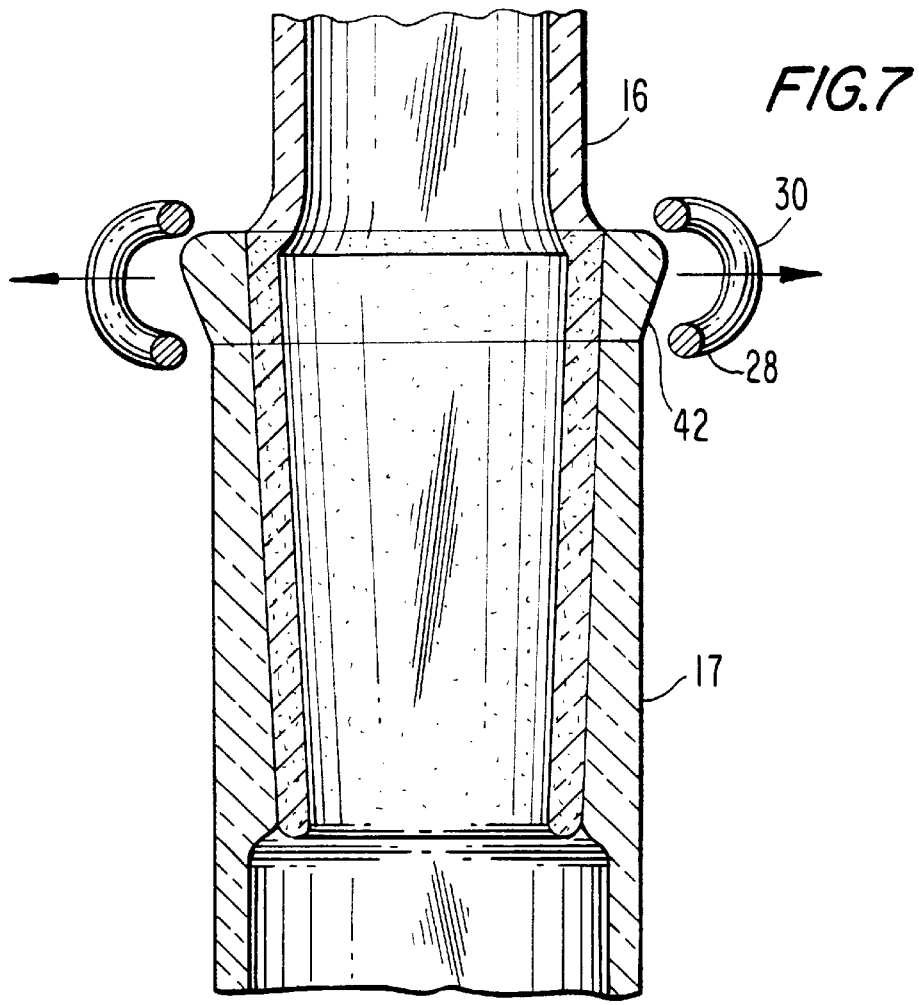
FIG. 7 is a vertical cross-sectional view of the clamp of FIG. 6 taken along the line 7—7 of FIG. 6.

Referring to FIGS. 6 and 7, to remove the clamp 18, lever arms 32 are compressed toward one another, against the spring bias force of the attaching collar 26. This action rolls the locking portions 28 around the periphery of the larger tube 17, and significantly, around the maximum diameter thereof, which causes the points at which the locking portions 28 contact the larger tube 17 to transfer from locking contact points B (which are forward of the transverse axis 38 as shown in FIG. 2) to releasing contact points B' (which are located at or, suitably, rearward of the transverse axis 38). In this position, since all contact points are on one side, rearwardly of the transverse axis 38, the clamp 18 is no longer securely attached to the tubes. The clamp 18, at this point, nearly pushes itself off, however a small amount of pulling force may be required to overcome the friction between the locking portions 28 and the large tube 17. Also, suitably lever arms 32 are longer than the locking portions 28 so that they provide a mechanical advantage in loosening the clamp 18. To enhance comfort in mounting and removing the clamp 18, the extreme ends of the lower arms 32 can be formed into loops.

Application of the clamp 18 is similar to its removal. First, lever arms 32 are compressed toward one another against the bias of the attaching collar 26. Then the guides 30 are aligned with the glass joint such that the attaching collar 26 and the locking portions 28 contact the upper and lower surfaces of the enlarged lip 42 of the larger tube 17. Next, the clamp 18 is pressed toward the glass joint. This pressure, urges the locking portions 28 over the maximum diameter of the larger tube 17 and beyond the transverse axis 38. As lever arms 32 are released, the resiliency of the attaching collar 26 urges the locking portions 28 toward one another and toward the locking contact points B (see FIG. 2). This action pulls the attaching collar 26 against the small tube 16, securely attaching the clamp 18 to the joint.

Figure 8:
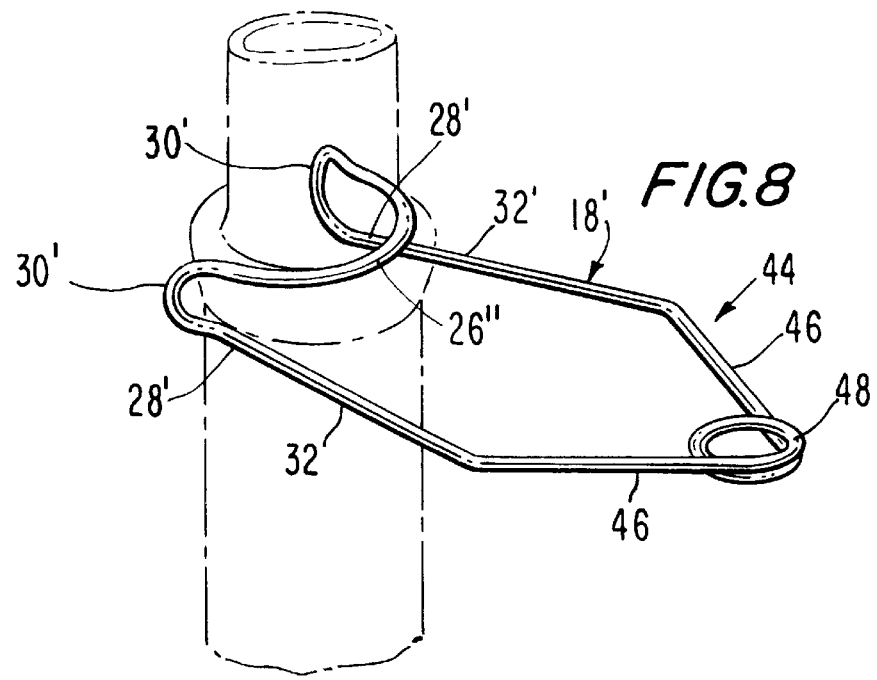
FIG. 8 is a perspective view of a third embodiment of the clamp of the invention.

Referring to the second embodiment of FIG. 8, the clamp 18' can also include a spring assisting portion 44 extending rearwardly from the lever arms 32' to provide additional outward pressure to the outward biased lever arms 32' to urge the locking portions 28' against the larger tube 17. The spring assisting portion 44 can include arms 46 connected to a spring 48, such as the helical spring depicted, however any similar booster spring configuration will suffice. Also, the spring assisting portion 44, can be in lieu of or in addition to the bias which is provided by the attaching collar 26". That is, if the clamp 18' includes a spring assisting portion 44, the attaching collar 26" need not provide resiliency or as much resiliency to urge locking portions 28' together.

In describing the clamp of the present invention reference is made in the specification and the claims to glass tubes that are combined via the ground glass joint. It is to be understood that the glass tubes are mentioned only for reference purposes, but do not form any part of the steel clamp of the present invention. Also, it should be understood that the specific form of the invention herein illustrated and described is intended to be representative only, as certain changes may be made therein without departing from the clear teachings of the disclosure. In this respect, some of the principles of the invention are applicable to other types of clamping devices. Accordingly, reference should be made to the following appended claims in determining the full scope of the invention.

We claim:

1. A clamp for securing a ground glass joint between a first tube having a smaller diameter, and a second tube having a larger diameter, the tubes each having a ground glass end adjoining an unground tube, the first tube having a shoulder intermediate the ground glass end and the unground tube adjacent the ground end, and the second tube having an enlarged lip at its end adjacent to the ground end, the clamp comprising:

a longitudinal axis having a forward end, and proceeding rearwardly along said longitudinal axis, (i) a mounting portion followed by an (ii) attaching portion having first and second parts for accommodating the shoulder and the enlarged lip therebetween, the attaching portion being followed by a (iii) releasing portion, all of said portions being substantially symmetrically disposed along the longitudinal axis of the clamp, said clamp further comprising a vertical axis that is perpendicular to said longitudinal axis, and a transverse axis that is perpendicular to said vertical axis and to said longitudinal axis at the maximum diameter of the tubes, (A) said mounting portion connecting said first and second parts and having forward ends extending substantially symmetrically along said longitudinal axis, said forward ends being biased toward one another by the clamp, (B) said first part of said attaching portion is an attaching collar for partially fitting around the circumference of the first tube adjacent to its shoulder at least rearwardly of said transverse axis, said second part has means for engaging the second tube at locking points located substantially symmetrically on the periphery of the second tube for locking together the first and second tubes, said locking points being adjacent to the enlarged lip forwardly of said transverse axis, (C) said second part being disposed below said first part about said vertical axis, and (D) said releasing portion having means for manually forcing apart said mounting portion and for transferring the contact between said second part and the second tube from said locking points to releasing leverage points located symmetrically on the circumference of the second tube rearwardly of said transverse axis, said releasing portion being operable by compressive force.

2. The clamp of claim 1, wherein said means for manually forcing apart said mounting portion and for transferring said contact between said second part and the second tube comprises lever arms substantially symmetrically extending rearwardly from said second part along said longitudinal axis, said lever arms being compressible toward one another against said bias, for moving said second part between said locking points and said releasing leverage points.

3. The clamp of claim 1, wherein said attaching collar further comprises parts which extend forwardly beyond said transverse axis, whereby said attaching collar is adapted to partially encircle the first tube when the clamp is securing the ground glass joint, and wherein said releasing portion is adapted to force apart said forwardly extending parts of said attaching collar when the clamp is to be removed from or mounted about the tubes.

4. The clamp as in claim 3 wherein said attaching collar is adapted to tightly partially encircle the first tube and to contact the shoulder thereof at points both rearwardly and forwardly of said transverse axis.

5. The clamp of claim 1, wherein said forward ends of said mounting portion point outwardly from said longitudinal axis in respectively opposed directions for easier insertion of the enlarged lip between said first and second parts.

6. The clamp of claim 5, wherein said first and second parts extend to form said forward ends of said mounting portion, and the ends of said first and second parts form an integral connection with each other.

7. The clamp of claim 6, wherein said integral connection is a forward curving substantially semicircular bending portion between the respective forward ends of said first and second parts.

8. The clamp of claim 1, wherein said first and second parts extend to form said forward ends of said mounting portion, and the ends of said parts form an integral connection with each other.

9. The clamp of claim 1, wherein:

(a) said means for manually forcing apart said mounting portion and for transferring said contact between said second part and the second tube comprises lever arms substantially symmetrically extending rearwardly from said second part along said longitudinal axis, said lever arms being compressible toward one another against said bias, for moving said second part between said locking points and said releasing leverage points;

(b) said attaching collar further comprises parts which extend forwardly beyond said transverse axis whereby said attaching collar is adapted to partially encircle the first tube when the clamp is securing the ground glass joint, and said partially circular attaching collar points outwardly from said longitudinal axis in respectively opposed directions for easier insertion of the enlarged lip between said first and second parts;

(c) said leverage arms being adapted to force apart said forwardly extending parts of said attaching collar when compressed together when the clamp is to be removed from about the tubes;

(d) said forwardly extending parts of said attaching collar and said locking portions being integrally connected and extending to form said forward ends of said mounting portion; and (e) said integral connection being a forward curving substantially semicircularly bent portion between the respective forward ends of said first and second parts.

10. The clamp of claim 9 wherein:
(a) said mounting, attaching and releasing portions comprise a single length of wire;
(b) said attaching collar comprises a semicircular section of said wire, said attaching collar having two ends and defining an arc greater than 180 degrees for partially encircling the first tube;
(c) said locking portions comprise two straight lengths of wire for contacting the circumference of the second tube, each said straight length of wire having forward and rearward ends;
(d) said mounting portion comprises two semicircular portions, each defining an arc of substantially 180 degrees and each connected between one of said ends of said attaching collar and one of said forward ends of said straight sections of wire; and
(e) said lever arms extending from said reward ends of said straight lengths of wire.

11. The clamp of claim 10 wherein said clamp further comprises first and second halves divided by said longitudinal axis, wherein said lever arms further comprise a rearward end, and wherein a distance between the reward end of the lever arm on said first half and the locking point on said first half is greater than a distance between said forward end of the inserting portion on said first half and said same locking point such that said lever arm provides a mechanical advantage in opening said clamp.

12. The clamp of claim 1 wherein said second part of said attaching portion further comprises curved portions which conform to the circumference of the second tube.

13. The clamp of claim 10 wherein said rearward ends of said lever arms are in the form of loops to provide greater comfort in mounting and removing the clamp.

14. The clamp as in claim 3 wherein said attaching collar loosely partially encircles the first tube and contacts the shoulder thereof only rearwardly of said transverse axis.

* * * * *